US008620477B2

(12) United States Patent
Skinner et al.

(10) Patent No.: US 8,620,477 B2
(45) Date of Patent: Dec. 31, 2013

(54) CONTROL FOR PRESSURIZED BLADDER IN A PATIENT SUPPORT APPARATUS

(75) Inventors: Andrew F. Skinner, Batesville, IN (US); Sandy M. Richards, Pershing, IN (US); David P. Lubbers, Cincinnati, OH (US); Steven A. Dixon, Cincinnati, OH (US); Richard B. Stacy, Daniel Island, SC (US); Aziz A. Bhai, West Chester, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 13/335,373

(22) Filed: Dec. 22, 2011

(65) Prior Publication Data

US 2012/0174322 A1 Jul. 12, 2012

Related U.S. Application Data

(63) Continuation of application No. 11/916,766, filed as application No. PCT/US2006/022732 on Jun. 12, 2006, now Pat. No. 8,090,478.

(60) Provisional application No. 60/689,340, filed on Jun. 10, 2006, provisional application No. 60/702,645, filed on Jul. 26, 2005.

(51) Int. Cl.
*G05D 9/00* (2006.01)

(52) U.S. Cl.
USPC .......... 700/281

(58) Field of Classification Search
USPC ........ 700/281; 600/595; 5/710, 713; 702/139
See application file for complete search history.

(56) References Cited

U.S. PATENT DOCUMENTS

| | | | |
|---|---|---|---|
| 2,719,986 | A | 10/1955 | Rand |
| 3,462,778 | A | 8/1969 | Whitney |
| 3,879,776 | A | 4/1975 | Solen |
| 4,224,706 | A | 9/1980 | Young et al. |
| 4,394,784 | A | 7/1983 | Swenson et al. |
| 4,542,547 | A | 9/1985 | Sato |
| 4,634,179 | A | 1/1987 | Hashimoto et al. |
| 4,694,409 | A | 9/1987 | Lehman |
| 4,694,520 | A | 9/1987 | Paul et al. |
| 4,700,180 | A | 10/1987 | Vance |
| 4,711,275 | A | 12/1987 | Ford et al. |
| 4,745,647 | A | 5/1988 | Goodwin |
| 4,751,754 | A | 6/1988 | Bailey et al. |
| 4,768,249 | A | 9/1988 | Goodwin |
| 4,793,428 | A | 12/1988 | Swersey |
| 4,797,962 | A | 1/1989 | Goode |

(Continued)

OTHER PUBLICATIONS

International Search Report and the Written Opinion from PCT/US-6/22732 dated Jul. 21, 2008, (5 pages).

*Primary Examiner* — Mohammad Ali
*Assistant Examiner* — Sivalingam Sivanesan
(74) *Attorney, Agent, or Firm* — Barnes & Thornburg LLP

(57) ABSTRACT

An apparatus for supporting a patient, such as a hospital bed, is provided. The apparatus includes a patient support surface and at least one fluid containing bladder. A pressure control assembly is operably coupled with the bladder. When the fluid pressure within the bladder falls outside of an acceptable range of pressure values, the active adjustment of the pressure within the bladder is initiated by the pressure control assembly if the pressure does not return to the acceptable range of pressure values within a time period, e.g., a time delay, that has a variable length.

10 Claims, 9 Drawing Sheets

(56) References Cited

U.S. PATENT DOCUMENTS

| | | | |
|---|---|---|---|
| 4,804,052 A | 2/1989 | Griffen | |
| 4,825,486 A | 5/1989 | Kimura et al. | |
| 4,829,616 A | 5/1989 | Walker | |
| 4,833,457 A | 5/1989 | Graebe, Jr. | |
| 4,833,614 A | 5/1989 | Saitoh et al. | |
| 4,852,195 A | 8/1989 | Schulman | |
| 4,864,671 A | 9/1989 | Evans | |
| 4,873,737 A | 10/1989 | Savenije | |
| 4,890,344 A | 1/1990 | Walker | |
| 4,897,890 A | 2/1990 | Walker | |
| 4,907,845 A | 3/1990 | Wood | |
| 4,949,412 A | 8/1990 | Goode | |
| 4,974,692 A | 12/1990 | Carruth et al. | |
| 4,986,738 A | 1/1991 | Kawasaki et al. | |
| 4,989,283 A | 2/1991 | Krouskop | |
| 4,993,920 A | 2/1991 | Harkleroad et al. | |
| 4,995,124 A | 2/1991 | Wridge, Jr. et al. | |
| 5,020,176 A | 6/1991 | Dotson | |
| 5,060,174 A | 10/1991 | Gross | |
| 5,117,518 A | 6/1992 | Schild | |
| 5,138,729 A * | 8/1992 | Ferrand | 5/713 |
| 5,140,309 A | 8/1992 | Gusakov | |
| 5,170,364 A * | 12/1992 | Gross et al. | 702/139 |
| 5,184,112 A | 2/1993 | Gusakov | |
| 5,189,742 A | 3/1993 | Schild | |
| 5,209,126 A | 5/1993 | Grahn | |
| 5,232,064 A | 8/1993 | Kroll et al. | |
| 5,235,319 A | 8/1993 | Hill et al. | |
| 5,251,349 A | 10/1993 | Thomas et al. | |
| 5,253,656 A | 10/1993 | Rincoe et al. | |
| 5,269,388 A | 12/1993 | Reichow et al. | |
| 5,276,432 A | 1/1994 | Travis | |
| 5,279,010 A | 1/1994 | Ferrand et al. | |
| 5,283,735 A * | 2/1994 | Gross et al. | 600/587 |
| 5,325,551 A | 7/1994 | Tappel et al. | |
| 5,345,629 A * | 9/1994 | Ferrand | 5/710 |
| 5,353,012 A | 10/1994 | Barham et al. | |
| 5,393,935 A | 2/1995 | Hasty et al. | |
| 5,393,938 A | 2/1995 | Bumbalough | |
| 5,396,671 A | 3/1995 | Stacy | |
| 5,410,297 A | 4/1995 | Joseph et al. | |
| 5,494,046 A | 2/1996 | Cross | |
| 5,509,154 A | 4/1996 | Shafer et al. | |
| 5,539,942 A | 7/1996 | Melou | |
| 5,542,136 A | 8/1996 | Tappel | |
| 5,560,374 A | 10/1996 | Viard | |
| 5,584,084 A | 12/1996 | Klearman et al. | |
| 5,586,347 A | 12/1996 | Frischknecht | |
| 5,606,756 A | 3/1997 | Price | |
| 5,611,096 A * | 3/1997 | Bartlett et al. | 5/617 |
| 5,611,772 A | 3/1997 | Fujimoto et al. | |
| 5,623,760 A | 4/1997 | Newham | |
| 5,625,914 A | 5/1997 | Schwab | |
| 5,630,238 A | 5/1997 | Weismiller et al. | |
| 5,633,627 A | 5/1997 | Newham | |
| 5,640,145 A | 6/1997 | Newham | |
| 5,652,484 A | 7/1997 | Shafer et al. | |
| 5,652,985 A | 8/1997 | Wilkinson et al. | |
| 5,654,694 A | 8/1997 | Newham | |
| 5,664,270 A | 9/1997 | Bell et al. | |
| 5,672,849 A | 9/1997 | Foster et al. | |
| 5,699,570 A | 12/1997 | Wilkinson et al. | |
| 5,747,745 A | 5/1998 | Neuman | |
| 5,774,917 A | 7/1998 | Liu | |
| 5,780,781 A | 7/1998 | Berger et al. | |
| 5,780,798 A | 7/1998 | Hall-Jackson | |
| 5,815,864 A | 10/1998 | Sloop | |
| 5,823,278 A | 10/1998 | Geringer | |
| 5,831,221 A | 11/1998 | Geringer et al. | |
| 5,846,206 A | 12/1998 | Bader | |
| 5,848,450 A | 12/1998 | Oexman et al. | |
| 5,850,644 A | 12/1998 | Hsia | |
| 5,859,390 A | 1/1999 | Stafford et al. | |
| 5,861,582 A | 1/1999 | Flanagan et al. | |
| 5,869,788 A | 2/1999 | Gordon et al. | |
| 5,879,309 A | 3/1999 | Johnson et al. | |
| 5,903,941 A | 5/1999 | Shafer et al. | |
| 5,944,066 A | 8/1999 | Viard | |
| 5,947,168 A | 9/1999 | Viard | |
| 5,963,997 A | 10/1999 | Hagopian | |
| 6,009,580 A | 1/2000 | Caminade et al. | |
| 6,014,784 A | 1/2000 | Taylor et al. | |
| 6,021,800 A | 2/2000 | Schild et al. | |
| 6,025,782 A | 2/2000 | Newham | |
| 6,034,526 A | 3/2000 | Montant et al. | |
| 6,036,660 A | 3/2000 | Toms | |
| 6,037,723 A | 3/2000 | Shafer et al. | |
| 6,047,424 A | 4/2000 | Osborne et al. | |
| 6,058,537 A | 5/2000 | Larson | |
| 6,058,538 A | 5/2000 | Chapman et al. | |
| 6,079,068 A | 6/2000 | Viard | |
| 6,092,249 A | 7/2000 | Kamen et al. | |
| 6,094,762 A | 8/2000 | Viard et al. | |
| 6,098,222 A | 8/2000 | Hand et al. | |
| 6,108,843 A | 8/2000 | Suzuki et al. | |
| 6,111,509 A | 8/2000 | Holmes | |
| 6,134,732 A | 10/2000 | Chapman et al. | |
| 6,145,142 A | 11/2000 | Rechin et al. | |
| 6,148,461 A | 11/2000 | Cook et al. | |
| 6,166,644 A | 12/2000 | Stroda | |
| 6,223,369 B1 | 5/2001 | Maier et al. | |
| 6,239,706 B1 | 5/2001 | Yoshiike et al. | |
| 6,252,512 B1 | 6/2001 | Riley | |
| 6,273,863 B1 | 8/2001 | Avni et al. | |
| 6,297,738 B1 | 10/2001 | Newham | |
| 6,307,476 B1 | 10/2001 | Smith et al. | |
| 6,349,439 B1 | 2/2002 | Cook et al. | |
| 6,353,950 B1 | 3/2002 | Bartlett et al. | |
| 6,362,439 B1 | 3/2002 | Reichow | |
| 6,378,152 B1 | 4/2002 | Washburn et al. | |
| 6,384,715 B1 | 5/2002 | Potter | |
| 6,385,803 B1 | 5/2002 | Viard | |
| 6,412,129 B1 | 7/2002 | Wu | |
| 6,417,777 B2 | 7/2002 | Fitzgerald et al. | |
| 6,441,742 B1 | 8/2002 | Lovely et al. | |
| 6,483,264 B1 * | 11/2002 | Shafer et al. | 318/16 |
| 6,544,200 B1 | 4/2003 | Smith et al. | |
| 6,583,727 B2 | 6/2003 | Nunome | |
| 6,646,556 B1 | 11/2003 | Smith et al. | |
| 6,686,711 B2 | 2/2004 | Rose et al. | |
| 6,721,980 B1 | 4/2004 | Price et al. | |
| 6,763,541 B2 | 7/2004 | Mahoney et al. | |
| 6,784,797 B2 | 8/2004 | Smith et al. | |
| 6,789,284 B2 | 9/2004 | Kemp | |
| 6,877,178 B2 | 4/2005 | Chapman et al. | |
| 6,917,293 B2 * | 7/2005 | Beggs | 340/573.1 |
| 7,036,171 B2 | 5/2006 | Wu | |
| 7,165,280 B2 | 1/2007 | Wang | |
| 7,424,760 B2 | 9/2008 | Chaffee | |
| 7,656,299 B2 | 2/2010 | Gentry et al. | |
| 2001/0001237 A1 | 5/2001 | Stroda et al. | |
| 2001/0015292 A1 | 8/2001 | Salgo | |
| 2002/0196148 A1 | 12/2002 | Nunome | |
| 2003/0063010 A1 | 4/2003 | Smith et al. | |
| 2003/0126670 A1 | 7/2003 | Graneto, III | |
| 2003/0145386 A1 | 8/2003 | Kemp | |
| 2003/0209893 A1 | 11/2003 | Breed et al. | |
| 2003/0216670 A1 * | 11/2003 | Beggs | 600/595 |
| 2004/0261182 A1 | 12/2004 | Biggie et al. | |
| 2008/0189865 A1 * | 8/2008 | Bhai | 5/706 |

* cited by examiner

CONTROL FOR PRESSURIZED BLADDER IN A PATIENT SUPPORT APPARATUS

CROSS REFERENCE TO RELATED APPLICATIONS

This application is a continuation of U.S. application Ser. No. 11/916,766, filed on Dec. 10, 2008, U.S. Pat. No. 8,090,478, issue date Jan. 3, 2012, which is a U.S. national counterpart application of international application serial No. PCT/US2006/022732 filed Jun. 12, 2006, which claims priority to U.S. Provisional Patent Application No. 60/689,340 filed Jun. 10, 2005 and U.S. Provisional Patent Application No. 60/702,645 filed Jul. 26, 2005. The entire disclosures of all of U.S. Ser. No. 11/916,766, PCT/US2006/022732, U.S. Ser. No. 60/689,340 and U.S. Ser. No. 60/702,645 are hereby incorporated by reference.

BACKGROUND

The present invention relates to patient support surfaces which include a pressurized bladder and a controller for regulating the pressure of the bladder.

Hospital beds are often outfitted with air-filled mattresses. These mattresses may be powered mattresses wherein the pressure in the air bladders is actively regulated. For example, some powered systems include a controller which receives a signal from pressure sensors and controls the operation of an air supply to regulate the pressure within the bladders of the air mattress.

SUMMARY

One embodiment of the invention takes the form of an apparatus for supporting a patient that includes a patient support surface, at least one fluid containing bladder and a pressure control assembly. The at least one bladder is positioned to provide support for the patient when the patient is bearing on the patient support surface for at least a portion of the patient support surface. The pressure control assembly is operably coupled with the at least one bladder and regulates the fluid pressure within the at least one bladder. The pressure control assembly includes a programmable controller which is programmed to monitor sensed pressure values of the fluid pressure within the at least one bladder and adjust the fluid pressure within the at least one bladder. The controller is programmed wherein an acceptable range of pressure values is defined and the controller initiates adjustment of the fluid pressure within the at least one bladder when a sensed value is located outside the acceptable range of pressure and a time period following the sensing of the sensed value has elapsed without the fluid pressure within the at least one bladder returning to the acceptable range of pressure, where the time period has a variable length.

For example, the first bladder may support the head and/or upper torso of a patient lying on the patient support surface while the second bladder supports the pelvic region of the same patient.

The time period may have a length that is a function of the difference between the sensed value and the acceptable range of pressure. The time period may have a length that is determined by a selected one of a plurality of different algorithms. Selection of the selected one algorithm may be a function of the difference between the sensed value and the acceptable range of pressure.

A first algorithm may be selected when the difference between the sensed value and the acceptable range of pressure does not exceed a first window value. A second algorithm may be selected when the difference between the sensed value and the acceptable range of pressure exceeds the first window value, where the time periods determined by the first algorithm have a first maximum value and the time periods determined by the second algorithm have a second maximum value. The first maximum value may be greater than the second maximum value. The time periods determined by the first algorithm may have a variable length and the time periods determined by the second algorithm may have a substantially invariable length. The second algorithm may initiate adjustment of the fluid pressure within the at least one bladder substantially immediately after determining that the difference between the sensed value and the acceptable range of pressure exceeds the first window value.

The time periods determined by the first algorithm may be a function of the stability of the sensed pressure values. The stability of the sensed pressure values may be a function of a difference between a first variable representative of a current sensed pressure value and a second variable representative of a moving average of a most recent set of the sensed pressure values. The time periods may include time periods that are a function of the stability of the sensed pressure values. The stability of the sensed pressure values may be a function of a difference between a first variable representative of a current sensed pressure value and a second variable representative of a moving average of a most recent set of the sensed pressure values. The difference between the first variable and the second variable may be less than or equal to a predetermined maximum value for a predetermined time period. The controller may initiate adjustment of the fluid pressure within the least one bladder after the time period elapses.

The predetermined maximum value may correspond to a pressure difference of approximately 0.5 inches of water in the at least one bladder and the predetermined time period may be at least as great as approximately 30 seconds. The acceptable range of pressure may be variable and the controller may calculate the acceptable range of pressure values as a function of the weight of the patient.

The patient support surface may be an articulating surface having a plurality of configurations. The acceptable range of pressure may be variable and the controller may calculate the acceptable range of pressures as a function of the configuration of the patient support surface.

The pressure control assembly may include a compressor in selective fluid communication with the at least one bladder. The compressor may controllably communicate fluid under pressure to the at least one bladder to thereby selectively adjust the fluid pressure within the at least one bladder. The pressure control assembly may further include at least one valve for regulating a fluid flow in communication with the at least one bladder, where operation of the at least one valve is controlled by the controller.

The controller may define a sleep mode method of operation, where activation of the sleep mode increases the size of the acceptable range of pressure values. The controller may remain in the sleep mode after adjustment of the fluid pressure.

The patient support may include a first fluid containing bladder, which may be disposed proximate the head end of the patient support surface and positioned to provide support for the patient when the patient is bearing on a portion of the patient support proximate the head end, as well as a second fluid containing bladder, which may be disposed substantially centrally between the head end and the foot end of the patient support and positioned to provide support for the patient when the patient is bearing on a portion of the patient support proximate a midpoint between the head end and the foot end. The pressure control assembly may be operably coupled with the first and second bladders and may regulate a first fluid pressure in the first bladder and a second fluid pressure in the second bladder. The pressure control assembly may include a programmable controller, which may be programmed to monitor sensed pressure values of the first and second fluid pressures and separately adjust the first and second fluid pressures, where an acceptable range of pressure values is determined for each of the first and second bladders and the controller initiates adjustment of one of the first and second fluid pressures when one of the sensed pressure values is located outside the respective one of the acceptable ranges of pressure values and a time period following the sensing of the sensed value has elapsed without the fluid pressure within the respective one of the first and second bladders returning to the respective one of the acceptable ranges of pressure values. The time period may have a variable length.

The patient support may further include a third fluid containing bladder disposed proximate the foot end of the patient support and positioned to provide support for the patient when the patient is bearing on a portion of the patient support proximate the foot end, where the pressure control assembly is operably coupled to the third bladder and regulates a third fluid pressure in the third bladder, the controller is programmed to monitor sensed pressure values of the third fluid pressure and independently adjust the third fluid pressure, where a third acceptable range of pressure values is determined for the third bladder and the controller initiates adjustment of the third fluid pressure when one of the sensed third fluid pressure values is located outside the third acceptable range of pressure values and a third time period following the sensing of the sensed value has elapsed without the fluid pressure within the third bladder returning to the third acceptable range of pressure values. The third time period may have a variable length.

The patient support may include an articulating surface and may include a first section disposed proximate the head end, a second section disposed in a central portion of the patient support surface and a third section disposed proximate the foot end, the first, second and third sections being relatively articulatable, where the first bladder is disposed in the first section, the second bladder is disposed in the second section and the third bladder is disposed in the third section. The acceptable ranges of pressure values for the first and second bladders may be a function of the weight of the patient and/or a function of a position of the first section. The third acceptable range of pressure values may be a function of the weight of the patient. The third range may or may not vary with changes in the position of the first section.

The patient support may include a weight sensing device operably coupled with the controller and the acceptable range of pressure values for each of the first and second bladders may be a function of the weight of the patient.

The first section of the patient support may be angularly repositionable relative to the second section. The controller may initiate inflation of the second bladder to a value above the respective acceptable range of pressure values and return the second bladder to the respective acceptable range of pressure values upon detection of movement of the first section through a predefined angular amount. The first section may be generally pivotable about a substantially horizontal axis and may be pivotally raised and lowered about the horizontal axis. The predefined angular amount may be non-directional with respect to the pivotal raising and the lowering of the first section about the horizontal axis. In one embodiment, the predefined angular amount may be no greater than an angular rotation of approximately 3 degrees about the horizontal axis.

The acceptable range of pressure values for the second bladder may be a function of the position of the first section of the articulating patient support surface and the controller initiated inflation may occur when movement of the first section results in a change in the acceptable range of pressure values for the second bladder. The acceptable range of pressure values for the second bladder may be a function of the position of the first section of the articulating patient support surface and the predefined angular amount may be sized where the controller initiated inflation is occurable without a change in the acceptable range of pressure values for the second bladder. The acceptable ranges of pressure values for the first and second bladders may define different ranges.

For each of the first and second bladders, a first algorithm may be selected when the difference between the sensed value and the acceptable range of pressure does not exceed a first window value and a second algorithm may be selected when the difference between the sensed value and the acceptable range of pressure exceeds the first window value. The time periods determined by the first algorithms may have a first maximum value and the time periods determined by the second algorithms may have a second maximum value. The first maximum values may be greater than the second maximum values. The first maximum values may be at least as great as approximately 10 minutes.

The time periods determined by the first algorithms may have a variable length and the second algorithms may initiate adjustment of the respective one of the first and second fluid pressures substantially immediately after determining that the difference between the sensed value and the respective acceptable rang of pressure exceeds the respective first window value.

The patient support surface may be an articulating surface and includes a first section disposed proximate the head end and a second section disposed in a central portion of the patient support surface, the first and second sections being relatively articulatable and wherein the first bladder is disposed in the first section and the second bladder is disposed in the second section. The acceptable range of pressure values for the second bladder may be a function of the position of the first section of the articulating patient support surface. The acceptable range of pressure values for each of the first and second bladders is a function of the position of the first section of the articulating patient support surface.

The pressure control assembly may include a compressor in selective fluid communication with the first and second bladders, the compressor controllably communicating fluid under pressure to the first and second bladders to thereby selectively increase the fluid pressure within the first and second bladders. The pressure control assembly may further include at least one valve for regulating a fluid flow in communication with the first and second bladders, operation of the at least one valve being controlled by the controller. The controller may define a sleep mode method of operation wherein the sleep mode increases the size of the acceptable ranges of pressure values. The controller may remain in the sleep mode after adjustment of a respective one of the fluid pressures.

Another embodiment of the invention takes the form of a method of supporting a patient. The method includes providing at least one fluid containing bladder to support at least a portion of the weight of the patient, monitoring the fluid pressure within the at least one bladder, and regulating the fluid pressure within the at least one bladder by defining an acceptable range of fluid pressures and adjusting the fluid pressure within the at least one bladder only when a fluid pressure value has been detected outside the acceptable range of fluid pressures and a time period following the detection of the fluid pressure value has elapsed without the fluid pressure within the at least one bladder returning to the acceptable range of fluid pressure values, the time period having a variable length.

The time period may have a length that is a function of the difference between the fluid pressure value and the acceptable range of fluid pressure values. The time period may have a length that is determined by a selected one of a plurality of different algorithms. Selection of the selected one algorithm may be a function of the difference between the fluid pressure value and the acceptable range of fluid pressure values.

A first algorithm may be selected when the difference between the fluid pressure value and the acceptable range of fluid pressure values does not exceed a first window value. A second algorithm may be selected when the difference between the fluid pressure value and the acceptable range of fluid pressure values exceeds the first window value, where the time periods determined by the first algorithm have a first maximum value and the time periods determined by the second algorithm have a second maximum value. The first maximum value may be greater than the second maximum value.

The time periods determined by the first algorithm may have a variable length and the time periods determined by the second algorithm may have a substantially invariable length. The second algorithm may initiate adjustment of the fluid pressure within the bladder substantially immediately after determining that the difference between the fluid pressure value and the acceptable range of fluid pressure values exceeds the first window value.

The time periods determined by the first algorithm may be a function of the stability of the monitored fluid pressure values. The stability of the monitored fluid pressure values may be a function of a difference between a first variable representative of a current monitored fluid pressure value and a second variable representative of a moving average of a most recent set of the monitored fluid pressure values. The difference between the first variable and the second variable may be less than or equal to a predetermined maximum value for a predetermined time period. The controller may initiate adjustment of the fluid pressure within the bladder after the time period elapses.

The predetermined maximum value may correspond to a pressure difference of approximately 0.5 inches of water in the bladder and the predetermined time period may be at least as great as approximately 30 seconds.

Still another embodiment of the invention takes the form of a pressure control assembly to regulate a fluid pressure in a bladder of a patient support. The pressure control assembly includes a sensor operable to sense fluid pressure within a bladder over time, and a programmable controller programmed to monitor sensed pressure, determine whether the sensed pressure is outside an acceptable range of pressure, the acceptable range having an upper boundary and a lower boundary, initiate adjustment of the fluid pressure within the bladder after a desired time period of delay following the sensing of sensed pressure has elapsed without the fluid pressure within the bladder returning to the acceptable range of pressure, change at least one of the upper boundary and the lower boundary of the acceptable range of pressure based on at least one of: a mode of operation of the patient support, a configuration of the patient support, and a characteristic of a person to be at least partially supported by the bladder, and determine the desired time period of delay based on at least one of: a difference between sensed pressure and the acceptable range of pressure, and an algorithm selected based on the difference between sensed pressure and the acceptable range of pressure.

The pressure control assembly may select a first algorithm when the difference between the sensed pressure and the acceptable range of pressure does not exceed a first window value. The pressure control assembly may select a second algorithm when the difference between the sensed pressure and the acceptable range of pressure exceeds the first window value, where the time periods determined by the first algorithm have a first maximum value and the time periods determined by the second algorithm have a second maximum value. The first maximum value may be greater than the second maximum value. The time periods determined by the first algorithm may have a variable length and the time periods determined by the second algorithm may have a substantially invariable length. The time periods may include time periods that are a function of the stability of the sensed pressure values. The pressure stability of the sensed pressure values may be a function of a difference between a first variable representative of a current sensed pressure value and a second variable representative of a moving average of a most recent set of the sensed pressure values.

The pressure control assembly may include an air supply coupled to the controller, a manifold coupled to the air supply, and a valve coupled to the manifold and to the bladder to selectively provide pressurized air to the bladder. The sensor may be operably coupled between the valve and the bladder. The sensor may alternatively or additionally be operably coupled between the controller and the bladder. The sensor may be located within the bladder.

Yet another embodiment of the invention takes the form of an air delivery system for a patient support including an inflatable support zone. The air delivery system includes an air supply, a valve coupled to the air supply, a pressure sensor operable to produce pressure signals indicative of air pressure with the support zone, and an air system controller programmed to determine a target pressure for the support zone, receive the pressure signals, determine whether pressure in the support zone deviates from the target pressure based on the received pressure signals, determine a time period to elapse before adjusting pressure in the support zone, wait for the time period to elapse, and adjust the pressure in the support zone after the time period has elapsed.

The target pressure may include an acceptable tolerance. The target pressure may be determined based at least in part on a weight of a patient. The air delivery system may include an angle sensor operable to produce an angle signal indicative of a value of an angle of the support zone relative to a longitudinal axis of the support zone, and the target pressure may be determined based at least in part on the angle signal.

The controller may be programmed to determine, based on at least one of the pressure signals and the angle signal, whether a person being at least partially supported by the support zone has changed positions. The time period may have an adjustable length and the controller may be programmed to determine a desired length of the time period.

In other embodiments, the controller may be responsive to a pressure signal from the pressure sensor, where the controller may use the pressure signal over time to determine a rate of change of pressure in the bladder. The controller may adjust a target pressure for the bladder based on the rate of change of pressure in the bladder.

In some embodiments, the inflatable patient support may further comprise an additional bladder and an additional pressure sensor which communicates with the additional bladder. The controller may be further responsive to the rate of change in the additional bladder.

In some embodiments, the controller may be responsive to the pressure signal to accumulate a deviation of the actual pressure in the bladder from a target pressure over time as a measure of potential damage to the skin of a patient supported on the inflatable patient support. The controller may adjust the target pressure of the bladder if the accumulated damage potential exceeds a predetermined value.

In other embodiments, the controller may be responsive to the rate of change of pressure within bladders to determine whether a patient supported on the inflatable patient support has transitioned between a lying position and a sitting position.

BRIEF DESCRIPTION OF THE DRAWINGS

The above mentioned and other features of the present invention, and the manner of attaining them, will become more apparent and the present invention will be better understood by reference to the following description of an exemplary embodiment of the present invention taken in conjunction with the accompanying drawings, wherein.

Although the exemplification set out herein illustrates an embodiment of the present invention, in one form, the embodiment disclosed below is not intended to be exhaustive or to be construed as limiting the scope of the invention to the precise form disclosed.

DETAILED DESCRIPTION

Figure 1:
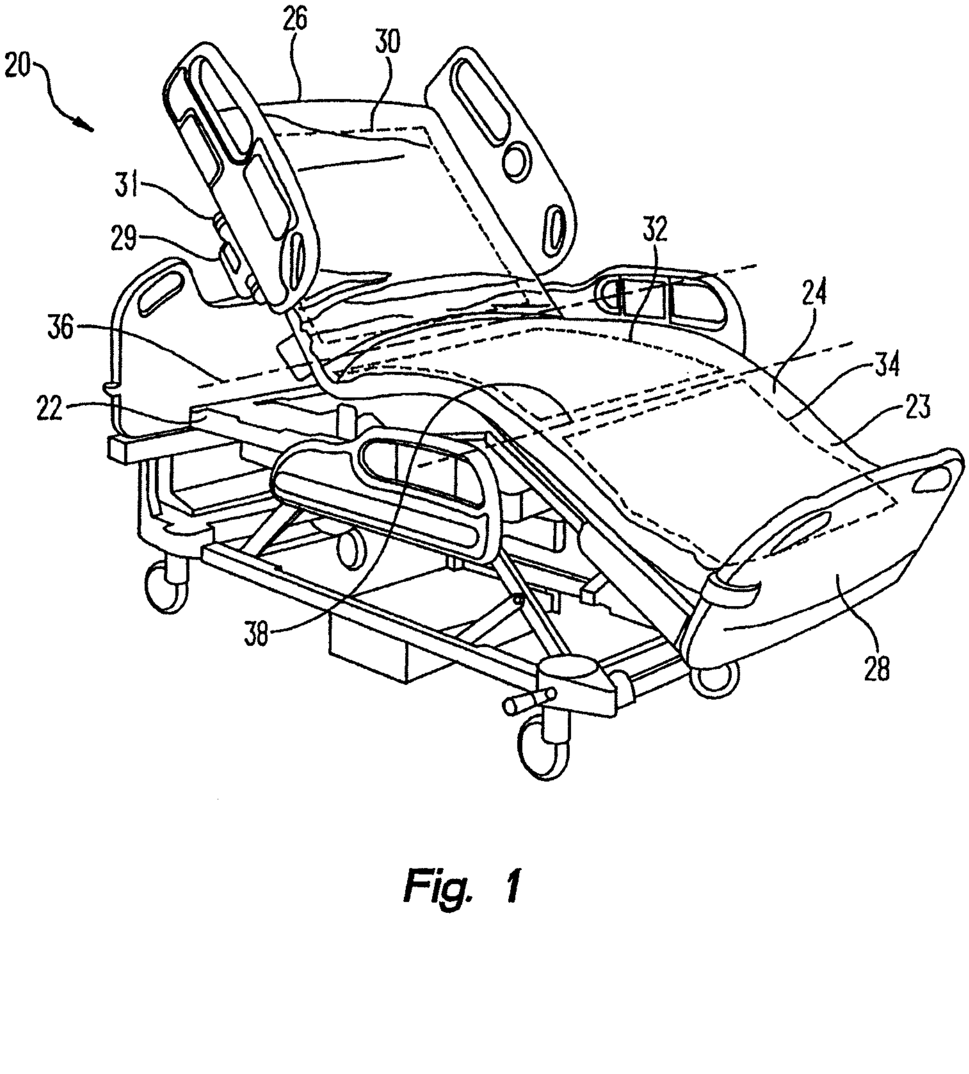
FIG. 1 is a perspective view of a hospital bed, pressurized bladders and a control system.

A hospital bed 20 is shown in FIG. 1 and includes a frame 22 and a mattress structure 23. The mattress or patient support member 23 has an upper patient support surface 24 on which a patient can be bearingly supported. The patient support surface 24 has a head end 26 and an opposite foot end 28. Patient support member 23 and patient support surface 24 are articulatable, respectively. Patient support member 23 can be positioned in a substantially planar configuration (not shown) so that patient support surface 24 forms a planar support surface for supporting a patient in the prone position in the same manner as a conventional non-articulating mattress.

Patient support member 23 and patient support surface 24 have at least three separate sections which are moveable relative to each other. A first section 30 is located near head end 26, a second section 32 is located in the central portion of patient support surface 24 and a third section 34 is located near foot end 28. When a patient is lying on patient support surface 24, first section 30 will typically support their head and upper torso, second section 32 will support their midsection, pelvic region and thighs and third section 34 will support their legs and feet. First section 30 can pivot relative to second section 32 about a horizontal axis 36 located at the joint between first and second sections 30, 32. Similarly, third section 34 is pivotable relative to second section 32 about another horizontal axis 38 located at the joint between second and third sections 32, 34.

In FIG. 1, first section 30 has been raised about axis 36 and third section 34 has been lowered about axis 38 to place patient support surface 24 in a chair-like configuration. The movement of the first, second and third sections 30, 32, 34 may also include limited translational movement and tilting movement relative to bed frame 22. The articulation of a mattress and patient support surface between a planar configuration and a chair configuration is well known in the art. A chair bed structure suitable for use with the present invention is disclosed by Foster et al. in U.S. Pat. No. 5,479,666 entitled FOOT EGRESS CHAIR BED, the disclosure of which is expressly incorporated herein by reference.

Figure 2:
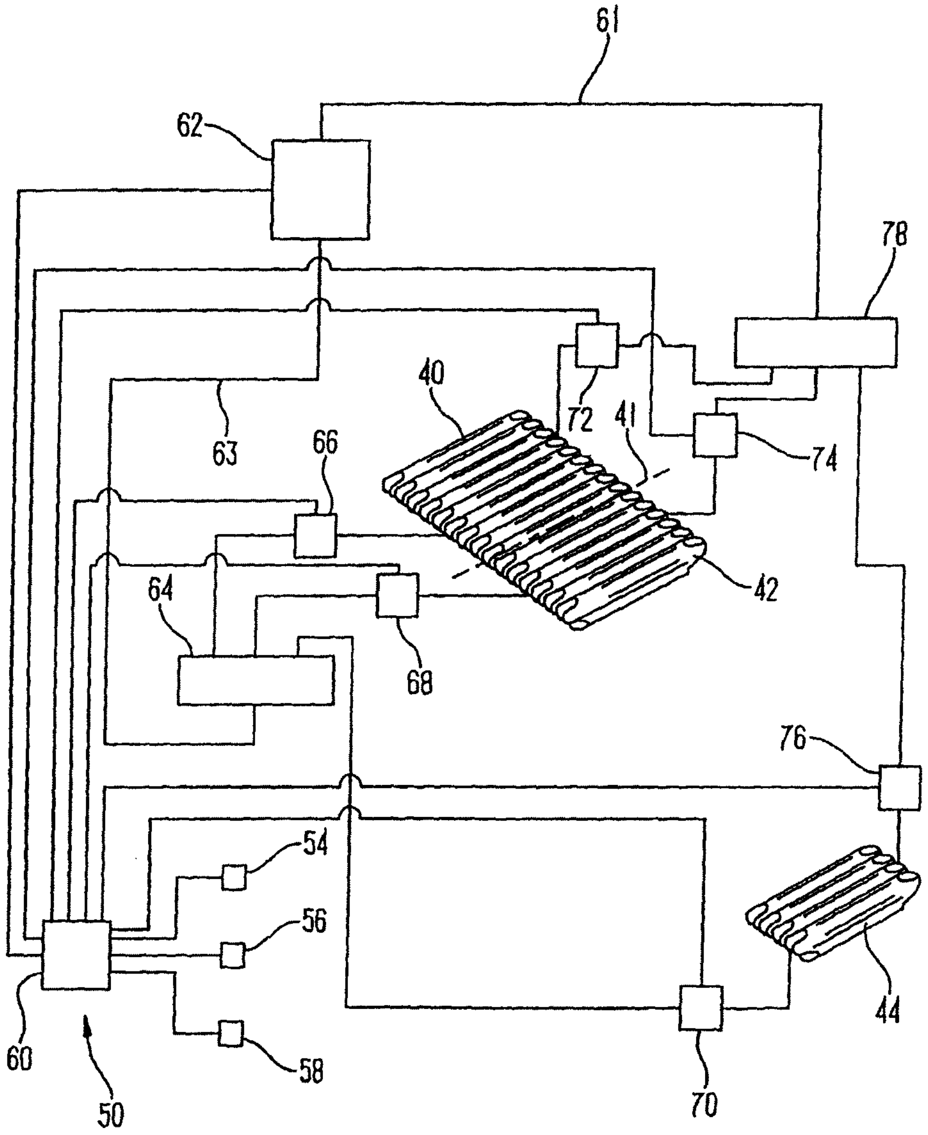
FIG. 2 is an exploded view of a portion of the hospital bed of FIG. 1 showing a configuration of the pressure control assembly.
Figure 2A:
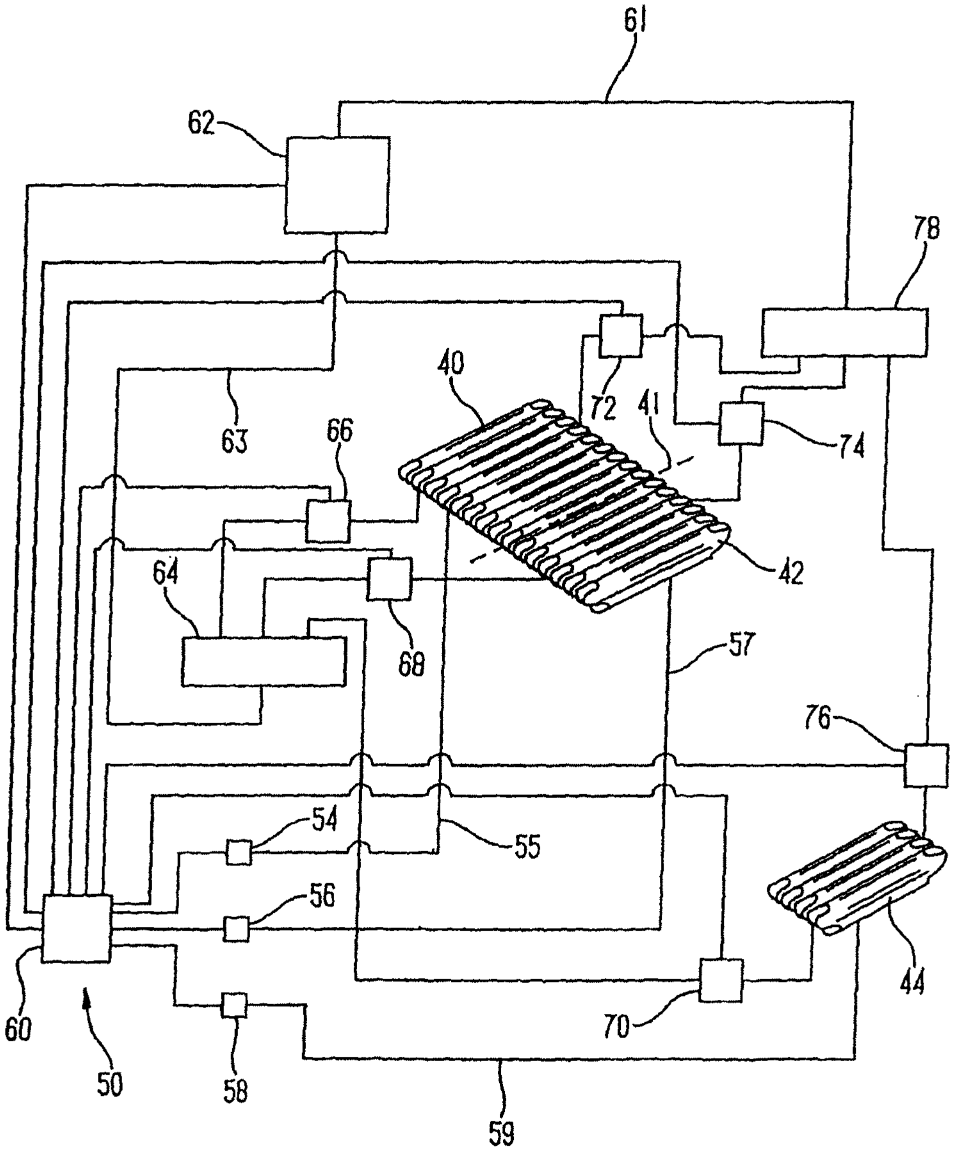
FIG. 2*a* is an exploded view of a portion of the hospital bed, showing another configuration of the pressure control assembly.
Figure 2B:
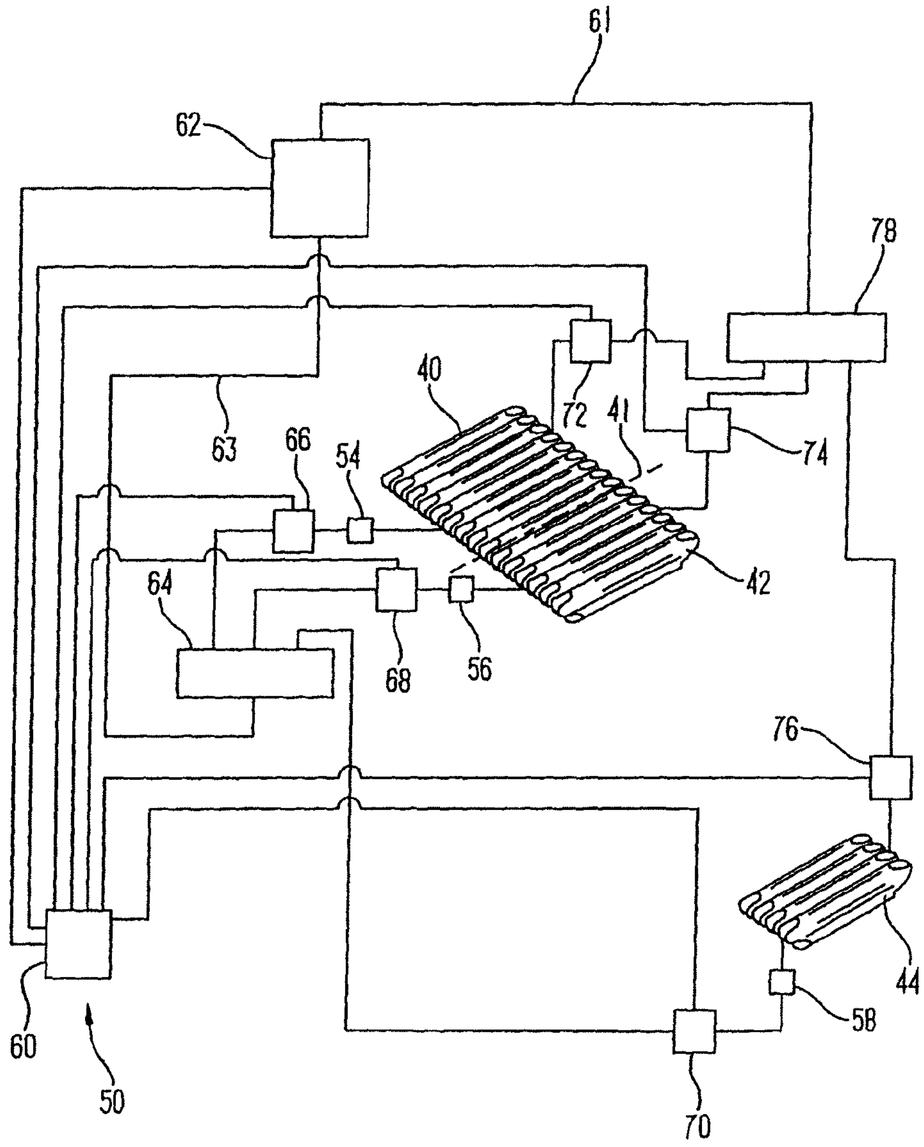
FIG. 2*b* is an exploded view of a portion of the hospital bed, showing yet another configuration of the pressure control assembly.
Figure 2C:
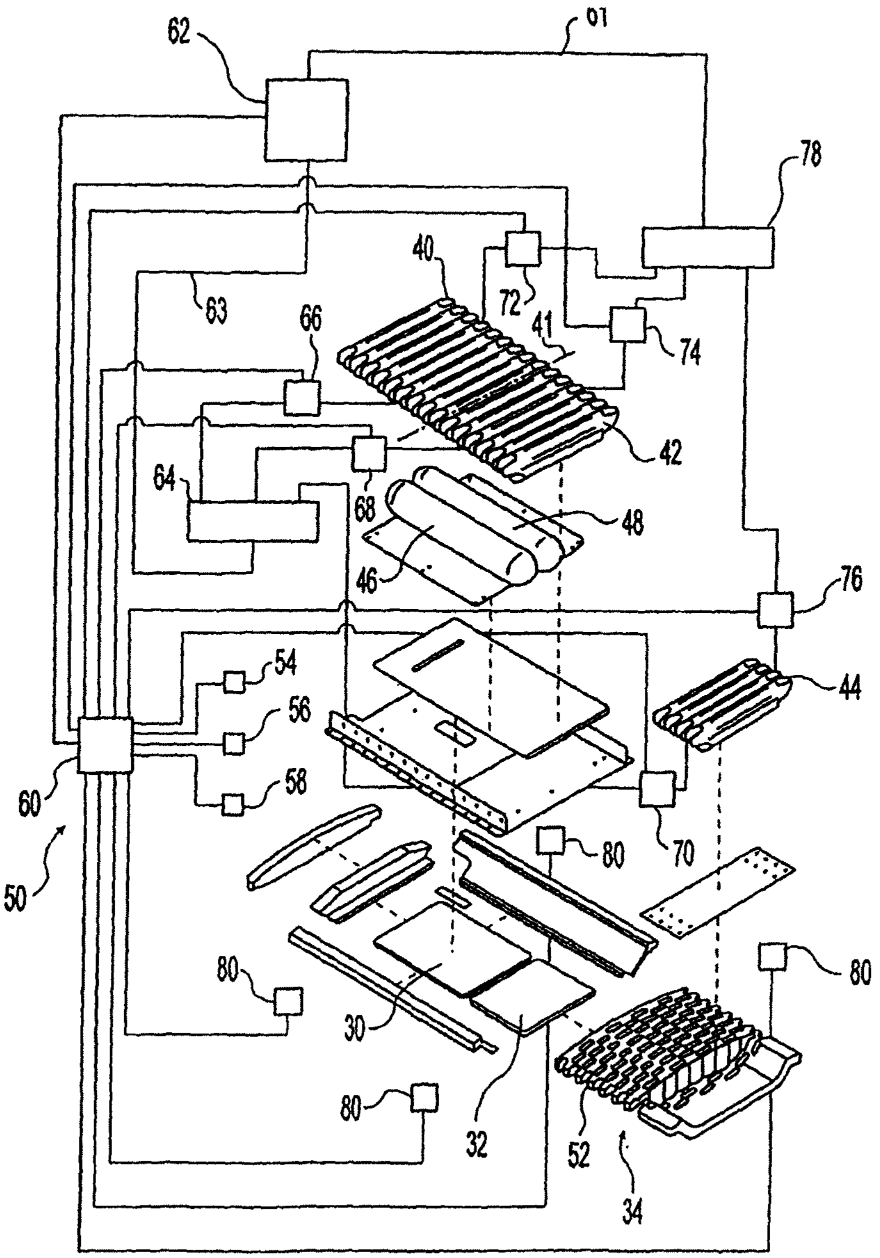
FIG. 2*c* is an exploded view of a portion of the hospital bed, showing yet another configuration of the pressure control assembly.

Embodiments of an exemplary patient support member 23 are shown in exploded schematic view in FIGS. 2, 2*a*, 2*b*, and 2*c*. Patient support member 23 may include pressurizable bladders or support zones including bladders 40, 42, 44, 46 and 48. Schematically shown in FIGS. 2, 2*a*, 2*b*, and 2*c* is a pressure control assembly or fluid delivery system 50 that regulates the fluid pressure within bladders 40, 42, 44, 46 and 48. Bladders 40, 42 and 44 are designed to reduce interface pressures between the patient and patient support surface 24 and thereby inhibit the formation of pressure ulcers. Bladders 40, 42 and 44 may also be employed for therapeutic purposes as is known in the art. As shown in FIG. 2*c*, bladders 46, 48 may be provided to be used by a caregiver to help turn the patient when moving the patient, changing the bed linens or when otherwise desirable. Bladders 46, 48 are normally uninflated but one of the two turning bladders 46, 48 may be inflated when it is desired to turn the patient.

First bladder 40 is located in first section 30 and is positioned proximate head end 26 to provide support for that part of the patient bearing on patient support surface 24 proximate head end 28. First bladder 40 will typically provide support for the head and upper torso of the patient. Second bladder 42 is located in second section 32 and is positioned substantially centrally between head end 26 and foot end 28 of patient support surface 24 to provide support for that part of the patient bearing on patient support surface 24 proximate a midpoint between head end 26 and foot end 28. Second bladder 42 will typically provide support for the pelvic region or midsection of the patient. Third bladder 44 is located in third section 44 and is positioned near foot end 28 of patient support surface 24 to provide support for that part of the patient bearing on patient support surface 24 near foot end 28. Third bladder 44 will typically provide support for the lower legs and heels of the patient.

In the embodiment of FIG. 2*c*, a compressible or extendable foam support member 52 is located in third section 34 and is positioned between second bladder 42 and third bladder 44. The length of third section 34 can be adjusted to place third bladder 44 in a position to support the heels of the patient with foam member 52 expanding and contracting to allow for the expansion and contraction of third section 34. Foam member 52 is positioned to provide support for portions of the thighs and upper calves of the patient which typically do not generate significant interface pressures on patient support surface 24. A foam topper (not shown) may be placed over bladders 40, 42, 44 and extendable foam member 52 to form a generally continuous upper layer for patient support member 23. Other suitable structures for use as patient support member 23 are disclosed by Washburn et al. in U.S. Pat. No. 6,378,152 B1 entitled MATTRESS STRUCTURE and Ellis et al. in U.S. Pat. No. 6,505,368 B1 entitled MATTRESS ASSEMBLY, the disclosures of both of which are hereby incorporated herein by reference.

In the illustrated embodiment, bladders 40, 42, 44, 46, 48 are inflatable air bladders, however, alternative embodiments may use pressurizable bladders that are filled with other fluids that are either gaseous or liquid. FIG. 2 schematically shows a pressure control assembly 50, which regulates the fluid pressures within bladders 40, 42, 44 and includes one ore more of a first, second and third pressure sensing devices 54, 56, 58, e.g., pressure transducers, for monitoring the fluid pressure within at least one of first, second and third bladders 40, 42, 44. In the embodiment of FIG. 2, sensors 54, 56, 58 are installed within the bladders; i.e., device 54 is installed in first bladder 40 for measuring the fluid pressure within first bladder 40; device 56 is installed in second bladder 42 for measuring the fluid pressure within second bladder 42; and device 58 is installed in third bladder 44 for measuring the fluid pressure within third bladder 44. In the illustrated embodiment, the readings of pressure sensing devices 54, 56, 58 are communicated to controller 60 via wiring.

In other embodiments, sensors 54, 56, 58 are not located within the bladders. In one such embodiment, shown in FIG. 2*a*, sensors are coupled to the one or more bladders and also to the controller 60 between the controller and the bladder via fluid communication lines and electrical wiring 55, 57, 59 to provide a distal sensing mechanism as that term is known in the art. An example of a type of distal sensing system can be found in the VersaCare® and Zonecare® products manufactured by the assignee of the present invention.

In another embodiment, shown in FIG. 2*b*, the one or more of sensors 54, 56, 58 are located in line with valves 66, 68, 70, to provide a proximal sensing mechanism as that term is known in the art. An example of a type of proximal sensing system can be found in the Totalcare® product manufactured by the assignee of the present invention.

Locating the sensors within the bladders may be desirable, for example to provide greater sensing accuracy and/or to reduce the time delay between sensing and controller responses. Locating the sensors outside the bladders, such as in either the distal or proximal sensing configuration may be desirable to reduce manufacturing costs or for other reasons. Additional pressure sensing devices (not shown) may be positioned to monitor the pressure in turning bladders 46, 48 as shown in FIG. 2*c*.

As shown, bladders 40, 42, 44 are not in direct fluid communication with each other. Each of the bladders 40, 42, 44 may have a different fluid pressure. In the illustrated embodiment, an air supply, such as a compressor 62 which is mounted in the power supply box of hospital bed 20, is employed to selectively supply each of the bladders 40, 42, 44 with pressurized air (i.e., air that is at a pressure above that of the ambient air pressure). An air blower or other suitable equipment could alternatively be used to supply pressurized air to bladders 40, 42, 44. Various air handling circuits can be employed to communicate the pressurized air discharged from compressor 62 to bladders 40, 42, 44 whereby the pressure within the bladders can be increased. In the illustrated embodiment, air compressor 62 has a discharge line 63 which feeds a manifold chamber 64. The flow of pressurized air from manifold 64 to first bladder 40 is regulated by valve 66. Valve 68 regulates the flow of pressurized air to bladder 42 from manifold 64 while valve 70 regulates the flow of pressurized air to bladder 44 from manifold 64. The operation of each of the valves 66, 68 and 70 is regulated by controller 60.

Bladders 40, 42, 44 can not only be selectively supplied with pressurized air by compressor 62 via manifold 64 and valves 66, 68, 70, but they may also be selectively and independently vented when it desired to reduce the fluid pressure in one or more of the bladders 40, 42, 44. For this purpose, a vent valve 72 is in fluid communication with first bladder 40, vent valve 74 is in fluid communication with second bladder 42 and vent valve 76 is in fluid communication with third bladder 44. The operation of each of the vent valves 72, 74, 76 is controlled by controller 60. In FIG. 2, each of the vent valves 72, 74, 76 are depicted as venting into box 78. Similarly, intake line 61 of compressor 62 is shown in communication with box 78. In the illustrated embodiment, box 78 represents a vacuum manifold, however, in alternative embodiments, valves 72, 74, 76 could vent into the ambient environment and intake line 61 could intake air from the ambient environment whereby box 78 would represent the ambient environment. The ability to apply a vacuum at the outlets of bladders 40, 42 may be beneficial when using bladders for therapeutic purposes which require relatively rapid changes in the pressure of the bladders.

As discussed in greater detail below, the pressure control assembly or air delivery system 50 independently regulates the fluid pressure of the first, second and third bladders 40, 42, 44 and each of these bladders may have a different target pressure to which the fluid pressure in the different bladders 40, 42, 44 is separately and independently adjusted. However, pressure adjustment of the bladders 40, 42, 44 may occur simultaneously or at different times or spaced apart time intervals.

Each of the bladders or support zones 40, 42, 44 may take the form of a single relatively large bladder or they may take the form of a bladder assembly having a plurality of smaller bladders in mutual fluid communication with the bladder assembly having an intake or "fill" valve and a vent valve. For example, a bladder assembly 40 could be formed by a series of smaller bladders that are in fluid communication with each other so that each of the smaller bladders forming bladder assembly 40 are each at the same approximate fluid pressure but wherein the smaller bladders forming bladder assembly 40 are not in communication with the bladders forming bladder assemblies 42, 44.

Alternatively, bladder 40 could be an assembly of smaller bladders that each have an intake or "fill" valve and vent valve and which are independently regulated by controller 60. For this type of bladder assembly, the bladders forming bladder assembly 40 would each be regulated in accordance with a common set of instructions having a common target pressure while the smaller bladders forming bladder assembly 42 could be regulated in accordance with a different set of common instructions having a different target pressure than that used with bladder assembly 40.

In the illustrated embodiment, bladders or support zones 40, 42, 44 are each an assemblage of smaller bladders in mutual fluid communication whereby a single valve 66, 68, 70 can regulate the inflow of pressurized fluid into the respective bladder assemblages 40, 42, 44 and a single valve 72, 74, 76 can regulate the discharge of fluid from the respective bladder assemblages 40, 42, 44. A dashed line 41 indicates the division between bladder 40 and bladder 42 in FIG. 2. In the illustrated embodiment, valves 66, 68, 70, 72, 74, 76 are each conventional 12-volt DC solenoid valves.

Bed 20 may also include a plurality of load cells 80 positioned between a weigh frame on which patient support member 23 is mounted and the base frame of bed 20. Load cells 80 are in communication with controller 60 and allow the weight of the patient to be monitored. The use of such load cells on a hospital bed for determining the weight of a patient is well known in the art.

Bed 20 may also include a head section angle monitor 31, such as an angle sensor to monitor changes in the elevation of the first section 30 or first bladder 40 relative to a longitudinal axis of the bed. In one embodiment, first bladder 40 is elevated by articulation of first section 30 relative to the frame 22. A linear actuator 29 drives the articulation of first section 30. The linear actuator 29 includes a potentiometer 31 which is driven by a motor (not shown). Rotation of a drive wheel of the potentiometer 31 changes the resistance value of the potentiometer 31 and thereby provides an indication of the length of linear actuator 29. The length of linear actuator 29 is correlated by the controller 60 to an angle of articulation of first section 30 relative to a longitudinal axis of frame 22 and the resulting angle of articulation of first bladder 40. Other suitable means of determining the angle of articulation of first bladder 40 may also be used, such as a ball switch. A ball switch may be coupled to or integrated with either first section 30 or first bladder 40.

Programmable controller 60 is configured to monitor the pressure values sensed by devices 54, 56, 58 and individually regulate the pressure of the fluid within bladders 40, 42, 44 by controlling the operation of compressor 62 and valves 66, 68, 70, 72, 74, 76. Air system controller 60 also receives input from load cells 80 and a head motor potentiometer coupled to first section 30 so that the patient weight and the position of first section 30 can be used in the regulation of the fluid pressure within bladders or support zones 40, 42, 44. Any suitable controller, or plurality of controllers, can be used to regulate the fluid pressures in bladders 40, 42, 44. In the illustrated embodiment, controller 60 is an Atmel T89C51CC01 controller which is a 8051 based CMOS controller commercially available from Atmel Corporation having a place of business in San Jose, Calif.

Bed 20 may have a construction that is generally similar to that of a VersaCare™ bed commercially available from Hill-Rom Company, Inc. having a place of business in Batesville, Ind. Another bed structure that can be readily adapted for use with the present invention is disclosed by Weismiller et al. in U.S. Pat. No. 5,715,548 entitled CHAIR BED the disclosure of which is expressly incorporated herein by reference.

The operation of the pressure control assembly or air delivery system 50 in regulating the fluid pressure within bladders 40, 42, 44, 46, 48 will now be discussed. There are six primary modes of operation for the bladders: (1) first, or right turn-assist; (2) second, or left-turn assist; (3) max-inflate mode; (4) pressure relief mode; (5) sleep; and (6) off.

Turn Assist Modes

Turning bladders 46, 48 are deflated in each of these modes except for the right turn-assist and left-turn assist modes. In the right-turn assist mode, bladder 46 is inflated while bladder 48 is deflated and in the left-turn assist mode, bladder 48 is inflated while bladder 46 is deflated. When entering either of these turn assist modes, the selected bladder is inflated to an extent that the patient is rotated to reach an approximately 20 degree angle with the major plane defined by patient support surface 24. The inflated turn bladder stabilizes for 10 seconds and, after sounding an alarm, deflates quickly. This inflation of the turn bladders may be used to assist the caregiver in turning the patient, for example, during linen changes, dressing changes, bed panning, back care and other nursing procedures.

Max-Inflate Mode

The max-inflate mode pressurizes each of the first, second and third bladders 40, 42, 43 to their maximum operating pressure to provide a firm patient support surface. The max-inflate mode is used for only short periods of time, e.g., when the patient is entering or exiting the bed or eating a meal. In the illustrated embodiment, the pressure in bladders 40, 42 is maintained within a pressure range of 25 to 29 (inches water). Similarly, when the bed is placed in a CPR status, the fluid pressure within bladders 40, 42 is maintained in a pressure range of 20 to 30 (inches water).

Pressure Relief Mode

The pressure relief mode seeks to reduce the interface pressure between patient support surface 24 and the patient by maintaining the pressure of each of the bladders 40, 42, 44 at a target pressure or within a window or range of acceptable pressures or within an acceptable tolerance of a target pressure. As discussed in greater detail below, a separate target pressure or range of acceptable pressures is defined for each of the bladders or zones 40, 42, 44. These target pressures or ranges of acceptable pressures are determined as a function of the weight of the patient. For bladders 40 and 42, the acceptable range of pressures is also a function of the position of section 30 with respect to a longitudinal axis of the bed 20, or "head angle" position.

When the pressure within one of bladders 40, 42, 44 deviates from the target pressure or acceptable range of pressure, the fluid pressure within that bladder is adjusted by operation of the pressure control assembly 50 unless it returns to the target or acceptable range prior to the elapse of a time delay. This time period or time delay which must elapse prior to the adjustment of the pressure within the bladder does not have a predefined length, but instead varies depending upon a number of variables associated with the deviation of the sensed pressure from the acceptable range of pressures.

Figure 5:
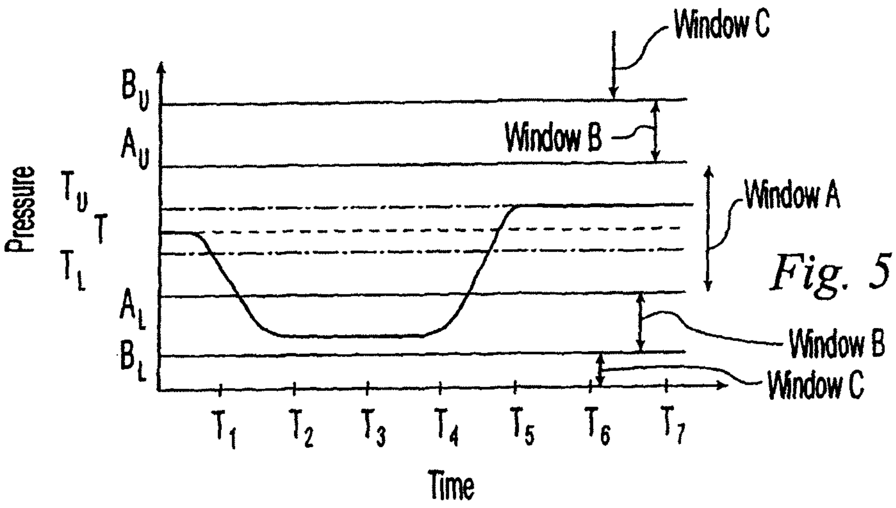
FIG. 5 is a chart depicting the fluid pressure within a bladder over a period of time.
Figure 6:
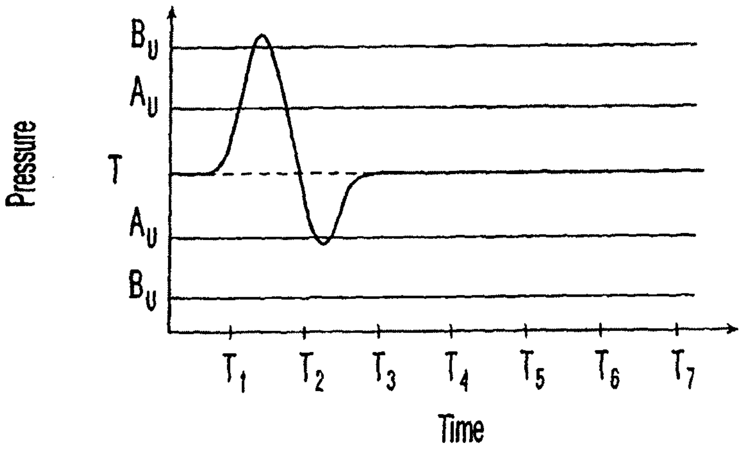
FIG. 6 is another chart depicting the fluid pressure within a bladder over a period of time.
Figure 7:
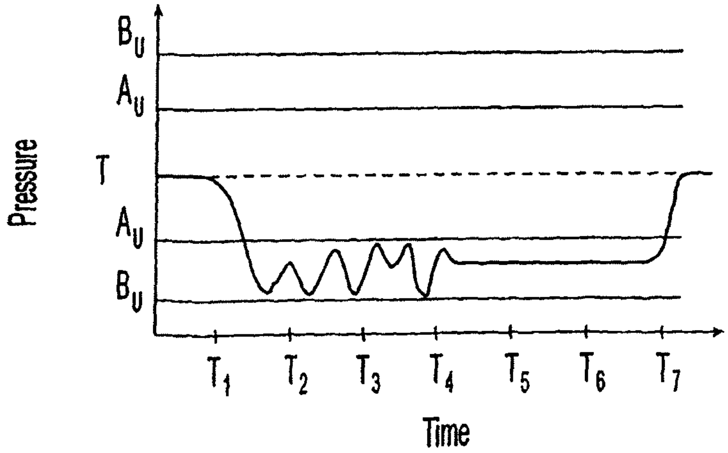
FIG. 7 is still another chart depicting the fluid pressure within a bladder over a period of time.

The time delay associated with the adjustment of the pressure of one of the bladders 40, 42, 44 is most easily understood with reference to FIGS. 5-7. Each of the FIGS. 5-7 contains a chart setting forth the sensed pressure within one of the bladders 40, 42, 44 over time. FIGS. 5-7 illustrate three different representative scenarios for the adjustment of the pressure which initiate the adjustment action after the elapse of different length time periods following the detection of a pressure value. FIGS. 5-7 are concerned with the pressure in only one of the bladders 40, 42, 44 which are separately and independently monitored and adjusted. Thus, the pressure of the other two bladders would be monitored and adjusted, based upon separate pressure readings, in accordance with the monitoring and adjustment represented by the charts depicted in FIGS. 5-7.

Although the pressure in the bladders 40, 42, 44 is separately and independently adjusted, the pressure adjustment of any or all of these bladders may occur at the same time or at spaced apart times. For example, if two (2) or more of the bladders are out of range and need to be deflated, then deflation of both bladders may occur at the same time or substantially simultaneously. However, if more than one (1) bladder needs to be inflated, it may be necessary to inflate the bladders sequentially instead of simultaneously. If the bladders are inflated sequentially, the bladders may each be assigned a priority, which is then used to determine the order of inflation. For example, a higher priority may be assigned to the bladder having the greatest difference between sensed value and calculated value in the shortest amount of time (i.e., the greatest change in pressure in the least amount of time). Also, articulation of a deck section of the bed 20 may affect the priority. For instance, if the head section is articulated above thirty (30) degrees, then the seat section bladder may be given higher priority than the head section bladder and thus, inflated first. Other factors, including where the bladders are located (i.e., foot, head, or seat section) may also be used to determine priority for adjusting the bladders.

In each of FIGS. 5-7, the pressure T is the target pressure at which it is desired to maintain the bladder. Pressures $A_L$ and $A_U$ represent the lower and upper limit respectively of the range of acceptable pressure, i.e., Window A. When the fluid pressure within the bladder is within the pressure range bounded by pressures $A_L$ and $A_U$ defining Window A, the pressure will be considered acceptable and no adjustment will be made to the pressure so long as it remains within this acceptable range. In the illustrated embodiment, target pressure T is at the midpoint of Window A, however, alternative embodiments could employ upper and lower limits to the acceptable range defining Window A that are not equidistant from the target pressure value.

A patient located on bed 20 will occasionally reposition themselves on patient support surface 24. In the course of repositioning themselves, the patient will likely cause fluid pressure fluctuations in one or more of the bladders 40, 42, 44. These pressure fluctuations caused by the repositioning exertions of the patient may cause the fluid pressure in one or more of bladders 40, 42, 44 to reach a value outside the acceptable range of pressure values defined by Window A. Once the patient has reached their new position and stopped moving on patient support surface 24, however, the pressure reading within bladders 40, 42, 44 will once again stabilize. Depending upon how the patient has repositioned themselves, the newly stabilized fluid pressure may or may not be within the acceptable range of pressure values defined by Window A.

If the fluid pressure within one of the bladders is actively adjusted during the course of the patient's repositioning exertions, it may prove necessary to "undo" the adjustment once the patient reached their new position on patient support surface 24 and the fluid pressure within the bladders has restabilized. Moreover, during repositioning, the patient may react to the inflation and/or deflation of bladders 40, 42, 44 and thereby prolong the cycle of pressure fluctuations and responsive adjustments. By delaying the adjustment of the fluid pressure after the initial detection of a pressure value outside the acceptable range of Window A some of these unnecessary fluid pressure adjustments can be avoided.

If the fluid pressure within the bladder diverges significantly from the acceptable range of fluid pressures defining Window A, a delay in returning the fluid pressure to a more acceptable value can be undesirable. For example, if the pressure diverges significantly above the acceptable range, the bladder could be damaged while, if the pressure diverges significantly below the acceptable range, the patient could "bottom out" and bear directly against the structure underlying the bladder. To limit the possibilities of such results, a second window or range of pressure values is defined immediately outside the range of acceptable pressure values both above and below the range of acceptable pressure values. This second set of ranges, i.e., Window B, is between pressure values $A_L$ and $B_L$ below Window A and is between pressure values $A_U$ and $B_U$ above Window A.

The values of $A_U$ and $A_L$ are chosen so that when the pressure within the bladder is in Window A, the anticipated interface pressure between the patient and patient support surfaces will provide pressure relief to the patient on bed 20. The values of $B_U$ and $B_L$ are chosen such that when the pressure within the bladder falls outside of Window A and enters Window B, the anticipated interface pressure between the bladder and patient will be acceptable for a brief time period without requiring immediate adjustment of the pressure. For example, the pressures defining Window B in the illustrated embodiment are chosen so that the anticipated interface pressures resulting from a Window B condition would be acceptable for a time period ranging from approximately 30 minutes to approximately 2 hours. As discussed in greater detail below, when the pressure within one of bladders 40, 42, 44 enters Window B, the active adjustment of the pressure is only initiated if the pressure does not return to Window A within a variable time period. Although the length of this time period can vary, the illustrated embodiment also imposes a maximum value of about 5 minutes upon this time period and if, after detecting a pressure value in Window B, the pressure has not yet returned to Window A and no pressure adjustment has been initiated after the elapse this maximum time period value, pressure control assembly 50 will initiate an adjustment of the pressure.

It should be noted that there could be multiple such Window B's (i.e. $B_1$, $B_2$, $B_3$, etc.) for example to respond to different out-of-range conditions having different acceptable time periods. In this case, the delay in the adjustment time period is different for each Window $B_1 \ldots B_N$. In other words, the delay period is different depending upon which Window $B_1 \ldots B_N$ the measured pressure is in.

Pressure values above $B_U$ and below $B_L$ define an additional range of pressure values, i.e., Window C. When the bladder pressure falls within Window C it will generally not provide any effective pressure relief to the patient. When the bladder pressure enters Window C, it is adjusted within a time period that is less than the time delay associated with the lesser pressure divergences of Window B. For example, the time period between detecting a pressure value in Window C and initiating the adjustment of the pressure in that bladder could fall within a range from about 0 to about 60 seconds. In the illustrated embodiment, once a pressure in Window C an adjustment of the pressure within that bladder is initiated within about 30 seconds.

A comparison of the charts of FIGS. 5 and 6 illustrate how a difference in the amount of divergence from the acceptable range of pressures results in differing response times for a corrective adjustment in the pressure. FIG. 5 illustrates the situation where the fluid pressure diverges downwardly from the target pressure into Window B, between times $T_1$ and $T_2$, but does not extend into Window C. In this situation, the pressure control assembly 50 does not immediately initiate an adjustment of the pressure and it is only when the pressure has not returned to the acceptable pressure range by time period $T_4$ that an adjustment of the pressure is initiated. FIG. 6, in comparison, illustrates a situation where the pressure diverges more significantly upwardly from Window A and passes through Window B to reach a pressure in Window C. Once this value in Window C above pressure Bu has been detected the adjustment of the pressure within the bladder is initiated without a time delay. FIG. 6 depicts the correction of the pressure overshooting to a value slightly below Window A before it is corrected to the desired pressure within Window A.

In the illustrated embodiment, if the measured pressure is not within Window A after the initial adjustment or corrective action (e.g., a controlled introduction of pressurized air into the bladder or a controlled partial venting of the bladder), a second adjustment will be allowed. A short delay period, e.g., about 20 seconds, will then be required regardless of the pressure value and following adjustments will take place based upon the then current pressure value.

When the pressure is actively adjusted and returned to the acceptable range of pressures of Window A, it is noted that the target pressure to which the adjustment seeks to return the pressure is not the actual central target pressure T as depicted in FIG. 6. Instead, two boundary values are employed, $T_L$, which is slightly less than T, and $T_U$, which is slightly greater than T. The pressure is returned to one of these two values as best depicted in FIG. 5. When the pressure must be decreased to return it to the acceptable range of Window A, it is returned to value $T_L$ and when it must be increased to return it to Window A, it is returned to value $T_U$. Thus, in FIG. 5, where the pressure has diverged below Window A to initiate the adjustment, it is returned to value $T_U$ and, in FIG. 6, where it has diverged above Window A to initiate the adjustment, it is returned to $T_L$. FIGS. 6 and 7 have been simplified and do not illustrate lines at pressure values $T_U$ and $T_L$ separately from the line at pressure value T. Similarly, for purposes of graphical clarity, Windows A, B and C are only labeled in FIG. 5.

A system is provided wherein the time delay associated with the initiation of the pressure adjustment varies between two different and fixed values with greater divergences from the acceptable pressure range, resulting in shorter time delays. For example, a system having a variable time delay is provided by using a fixed time delay, e.g., five or ten minutes, when the pressure diverges into Window B and a shorter fixed time delay, e.g., 30 seconds or a minute, when the pressure diverges into Window C. A more sophisticated system, however, can be used to provide even greater flexibility.

The illustrated embodiment utilizes a short fixed time delay for when the detected pressure enters Window C, but utilizes a time delay that is a function of the stability of the pressure reading when the pressure is in Window B. As best understood with reference to FIGS. 5 and 7, when the pressure within the bladder enters Window B a positive adjustment of the pressure to return the pressure to Window A only occurs if the pressure maintains a relatively stable value in Window B for a predefined time period or the maximum time period elapses without the pressure returning to Window A.

FIG. 5 illustrates a situation where the pressure diverges into Window B and remains stable within Window B from approximately time period $T_2$ to time period $T_4$ at which time the adjustment of the pressure is initiated. In the situation depicted in FIG. 7, the pressure diverges into Window B and fluctuates within Window B from time period $T_2$ until after time period $T_4$. The pressure then stabilizes within Window B and remains relatively stable from approximately time period $T_5$ until time period $T_7$ when the pressure is positively adjusted and returned to Window A.

As can be seen, the initial fluctuation of pressure in Window B in the situation depicted in FIG. 7 delayed the adjustment of the pressure which only occurred after the pressure had stabilized within Window B. If the pressure had remained in Window B and remained erratic, an adjustment would have occurred after the elapse of the maximum time delay period, which in the illustrated embodiment is about 10 minutes. It is further noted that the pressure traces shown in FIGS. 5-7 are idealized traces selected to illustrate the operation of the system and a "stable" pressure reading will typically not have the perfectly consistent character shown in the Figures. The stability of the pressure can be determined in various manners. For example, the current pressure value can be compared to a moving average of the most recent pressure readings and when the current pressure values remain within a predefined range surrounding the moving average for a predefined time period, the pressure can be considered to have stabilized. The process used in the illustrated embodiment to assess the stability of the pressure is described in greater detail below.

In FIGS. 5-7, the "boundary" values of T, $T_U$, $T_L$, $A_U$, $A_L$, $B_U$ and $B_L$ all remain constant over time. In the illustrated embodiment and as set forth in greater detail below, however, these boundary values may be determined as a function of other variables that may include the patient weight, the angular position of section 30, and the location of a patient on the mattress. The boundary values may change, for example, if sensors detect a patient changing from a supine or prone position to a sitting up position, or moving from the center of the bed to the edge of the bed, or vice-versa. Thus, the boundary values can change over time.

The patient weight readings can also be employed to impose a delay on the adjustment of the fluid pressure within bladders 40, 42, 44. For example, a change of at least 5 pounds in the detected weight of the patient will often be indicative of patient movement on the bed. Accordingly, whenever a change in the patient weight of at least 5 pounds is detected, all adjustments of bladder pressure can be delayed for a predefined time period, e.g., 30 or 60 seconds, to limit unnecessary pressure adjustments.

Sleep Mode

The sleep mode is designed to minimize the disturbance of the patient. The air compressor noise and the raising and lowering of patient support surface 24 associated with the adjustment of the bladder pressures has the potential to disturb the sleep of some patients. To minimize such disturbances, a sleep mode having a length of eight hours is provided. The sleep mode operates in a manner similar to the pressure relief mode but the maximum time period for initiating adjustment when the pressure is in Window B is increased from about 5 minutes to about 10 minutes and the maximum time period for initiating adjustment when the pressure is in Window C is increased from about 30 seconds to about 1 minute. It is also possible to increase the range of acceptable pressures defining Window A when entering the sleep mode to further minimize the number of times that the pressure within bladders 40, 42, 44 must be adjusted. The illustrated embodiment remains in the sleep mode after adjusting the pressure in the bladders and only returns to the normal pressure relief mode after an eight hour time period has elapsed, or, the sleep mode has been overridden by some other operation of the controller, e.g., placing the system in CPR (Max-inflate) mode or manually returning the controller to normal pressure relief mode.

Off Mode

The off mode deactivates the system and is used when cleaning or conducting maintenance on bed 20 or when bed 20 is not in use. The off mode is not employed when a patient is using bed 20. When the system is turned back on after being placed in the off mode, the system starts out in the pressure relief mode.

Seat Boost Operations

When the mattress is in pressure relief mode and the position of section 30 is changed by more than about 3 degrees, the seat bladder, i.e., bladder 42 will be subjected to a "seat boost" procedure. In this procedure, the pressure in bladder 42 is increased to a relatively high pressure and then returned to the target pressure within Window A. This procedure is employed because bladder 42 can have two different volumes for a particular pressure value and the seat boosting operation ensures that bladder is at the desired volume for the target pressure. Such seat boosting procedures are known in the art and are typically employed when the head section of the bed, e.g., section 30, is being raised and has been raised by a sufficient amount to change the boundary value pressure values of the seat bladder. The illustrated embodiment, however, employs the seat boosting procedure whenever the angle of section 30 is altered by about 3 degrees or more regardless of whether it is being raised or lowered and regardless of whether the target pressure of any of the bladders 40, 42, 44 have been altered by the change in position of section 30. A similar "seat boost" procedure may alternatively or additionally be triggered by a change in a patient's location or position on the mattress. For example, if sensors detect the patient moving from a supine or prone position to a sitting up position, or from the center of the bed to an edge of the bed, or vice versa, pressure in bladder 42 may be adjusted according to the procedure described above.

Calculations and Flow Charts

An exemplary set of equations that are used with the illustrated embodiment and a description of the instructional logic underlying the operation of pressure control assembly 50 will now be presented with the aid of the flow charts illustrated in FIGS. 4, 4*a*, 4*b*, 5, 5*a*, 5*b*, 6.

The position of section 30 is employed by some of the formulas defining the boundary values and the following regions have been defined for the position of section 30 or "Head_Elevation" for this purpose:

| Region | Min. Angle | Max. Angle | "Head_Elevation" Value for use in Equations |
|---|---|---|---|
| 0 | 0 degrees | 7.5 degrees | 7.5 degrees |
| 1 | 3.5 degrees | 15 degrees | 15 degrees |
| 2 | 11 degrees | 30 degrees | 30 degrees |
| 3 | 26 degrees | 45 degrees | 45 degrees |
| 4 | 41 degrees | 65 degrees | 60 degrees |

With regard to the boundary values of the first bladder 40 in the pressure relief mode, the following formulas are employed:

Pressure_Head=(Patient_Weight/49.70)+((Head_Elevation/−77.4)+3.4)

wherein:

"Patient_Weight" is the weight of the patient in tenths of pounds with no decimal point; and "Head_Elevation" is in degrees. The obtained value of "Pressure_Head" is the target pressure value T for first bladder 40 measured in inches of water. The boundary values defining Window A for first bladder 40 are then determined in accordance with the following table:

| High Pressure Boundary Value ($A_U$) | Low Pressure Boundary Value ($A_L$) | Inflate Boundary Value ($T_U$) | Deflate Boundary Value ($T_L$) |
|---|---|---|---|
| Pressure_Head + 1 (inches water) | Pressure_Head − 1 (inches water) | Pressure_Head + 0.5 (inches water) | Pressure_Head − 0.5 (inches water) |

The parameters of Window B for first bladder 40 are determined in accordance with the following equation:

Pressure_Head=((Patient_Weight/100)+1)*3 wherein:

"Patient_Weight" is the weight of the patient in tenths of pounds with no decimal point. The obtained value of "Pressure_Head" is then used to determine the parameters of Window B in accordance with the following table:

| High Pressure Boundary Value ($B_U$) | Low Pressure Boundary Value ($B_L$) |
|---|---|
| Pressure_Head + 1 (inches water) | $B_L$ is set at the same value as $A_L$ (inches water) |

With regard to the boundary values of second bladder 42 in the pressure relief mode, the following formulas are employed:

When the Head_Elevation is less than 55 degrees:

Pressure_Seat=(Patient_Weight/31.10)+((Head_Elevation/12.2)+1.8)

and when the Head_Elevation is greater than 55 degrees:

Pressure_Seat=((Patient_Weight/50)+4)*((Head_Elevation/12.2)+1)

wherein:

"Patient_Weight" is the weight of the patient in tenths of pounds with no decimal point; and "Head_Elevation" is in degrees. The obtained value of "Pressure_Seat" is the target pressure value T for second bladder 42 measured in inches of water. The boundary values defining Window A for second bladder 42 are then determined in accordance with the following table:

| High Pressure Boundary Value ($A_U$) | Low Pressure Boundary Value ($A_L$) | Inflate Boundary Value ($T_U$) | Deflate Boundary Value ($T_L$) |
|---|---|---|---|
| Pressure_Seat + 1 (inches water) | Pressure_Seat − 1 (inches water) | Pressure_Seat + 0.5 (inches water) | Pressure_Seat − 0.5 (inches water) |

The parameters of Window B for second bladder 42 are determined in accordance with the following equation:

Pressure_Seat=((Patient_Weight/50)+4)*((Head_Elevation/60)+1)

wherein:

"Patient_Weight" is the weight of the patient in tenths of pounds with no decimal point; and "Head_Elevation" is in degrees. The obtained value of "Pressure_Seat" is then used to determine the parameters of Window B in accordance with the following table:

| High Pressure Boundary Value ($B_U$) | Low Pressure Boundary Value ($B_L$) |
|---|---|
| Pressure_Seat + 1 (inches water) | $B_L$ is set at the same value as $A_L$ (inches water) |

With regard to the boundary values of third bladder 44 in the pressure relief mode, the following formulas are employed:

Pressure_Heel=((Patient_Weight/200)+1)

wherein:

"Patient_Weight" is the weight of the patient in tenths of pounds with no decimal point. The obtained value of "Pressure_Heel" is the target pressure value T for third bladder 44 measured in inches of water. The boundary values defining Window A for third bladder 44 are then determined in accordance with the following table:

| High Pressure Boundary Value ($A_U$) | Low Pressure Boundary Value ($A_L$) | Inflate Boundary Value ($T_U$) | Deflate Boundary Value ($T_L$) |
|---|---|---|---|
| Pressure_Heel + 0.50 (inches water) | Pressure_Heel − 0.50 (inches water) | Pressure_Heel + 0.25 (inches water) | Pressure_Heel − 0.25 (inches water) |

The parameters of Window B for third bladder 44 are determined in accordance with the following equation:

Pressure_Heel=((Patient_Weight/200)+1)

wherein:

"Patient_Weight" is the weight of the patient in tenths of pounds with no decimal point.

The obtained value of "Pressure_Heel" is then used to determine the parameters of Window B in accordance with the following table:

| High Pressure Boundary Value ($B_U$) | Low Pressure Boundary Value ($B_L$) |
|---|---|
| Pressure_Heel + 1.5 (inches water) | Pressure_Heel − 1.5 or 0.0, whichever is greater (inches water) |

Figure 3A:
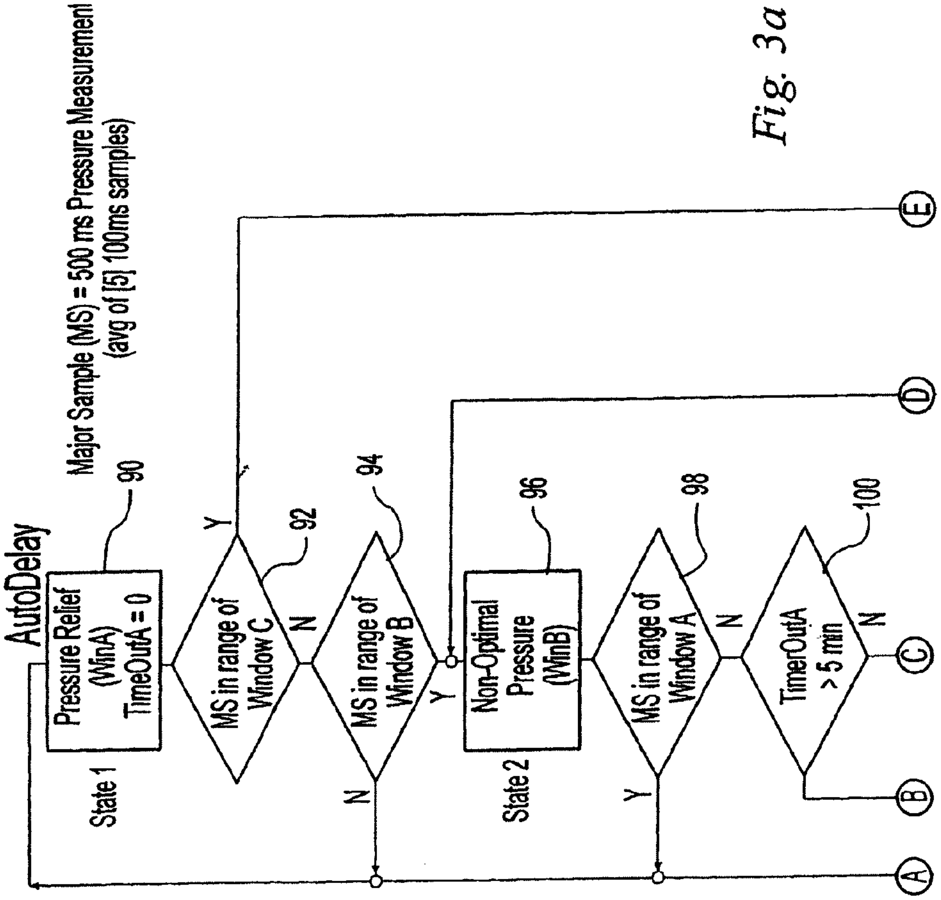
FIG. 3*a* is a detail view of the upper portion of the flow chart of FIG. 3.
Figure 3:
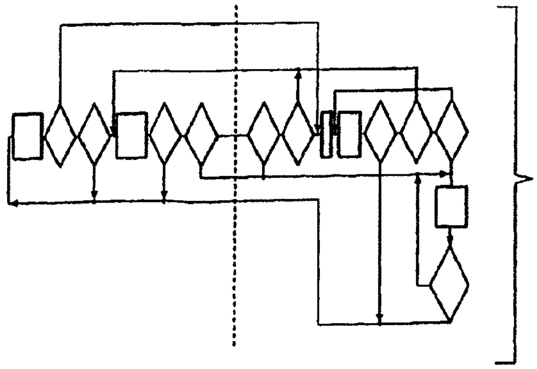
FIG. 3 is an overview diagram of a flow chart depicting the autodelay function used with the adjustment of the fluid pressure.
Figure 3B:
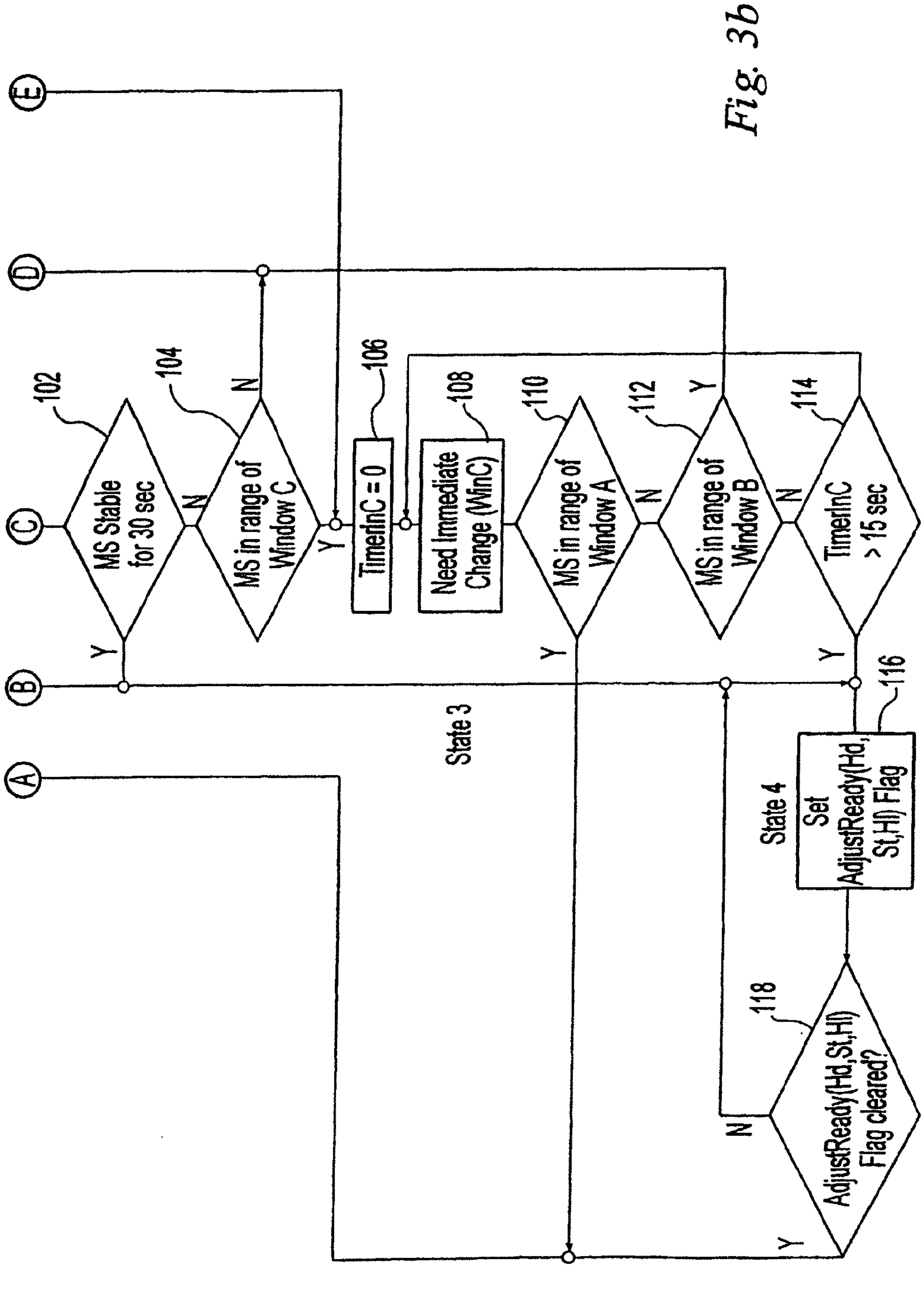
FIG. 3*b* is a detail view of the lower portion of the flow chart of FIG. 3.

The flow chart depicted in FIG. 3 is shown in greater detail in FIGS. 3*a* and 3*b* and illustrates the AutoDelay function of pressure control assembly 50 for one of bladders 40, 42, 44. The AutoDelay function has four different states as represented by boxes 90, 96, 108 and 116. State 1, box 90, generally corresponds to the pressure being within Window A; State 2 generally corresponds to the pressure being within Window B; State 3 generally corresponds to the pressure being within Window C and State 4 corresponds to the initiation of an active adjustment of the pressure in the bladder.

The "MS" or Major Sample pressure values utilized by algorithm depicted in FIG. 3 are obtained by averaging the five most recent pressure values obtained from the relevant pressure sensing device which are each representative of the pressure readings over a 100 millisecond time period. Thus, in the illustrated embodiment, the MS value is representative of the pressure within the bladder during the previous 500 milliseconds.

In box 90, the TimeoutA is reset to 0 (if the system departs from Window A and State 1, the TimeoutA value will represent the time elapsed since the pressure departed from Window A). At box 92 the MS value is checked to determine if it falls within Window C, if it is within Window C, the system proceeds to box 106 where the timer for Window C, i.e., TimerInC, is initiated. If, at box 92, the MS value is not in Window C, the system proceeds to box 94 where it is determined whether the MS value is in Window B. If the MS value is not in Window B, the pressure must be in Window A and the system returns to box 90. If the MS value is determined to be within Window B at box 94, the system proceeds to box 96 and enters State 2. At box 98 the current MS value is checked to see if it has returned to Window A, if so, the system returns to box 90 without initiating an adjustment of the pressure. If the current MS value is outside Window A, the system proceeds to box 100 where the TimerOutA is checked to determine if the pressure has been outside Window A for more than 5 minutes. (In the sleep mode, this value is increased to 10 minutes.) If so, the system proceeds to box 116 where a flag for initiating the adjustment of the pressure is set. If the pressure has been outside Window A for less than 5 minutes, the system proceeds to box 102 where the stability of the pressure values is checked. (FIG. 4, discussed below, illustrates the determination of the stability of the pressure values.) If the pressure has been stable for the last 30 seconds, the system proceeds to box 116 and the adjustment of the bladder pressure is initiated. If the pressure has not been stable for the last 30 seconds, the system proceeds to box 104 where it is determined whether the current MS value is in Window C. If the current MS value is not in Window C, the system returns to box 96 and remains in State 2. If the current MS value is in Window C, the system proceeds to box 106 and the Window C timer is initiated.

After initiating the Window C timer, box 108 indicates that the system is in State 3 and the system then proceeds to box 110. At box 110, the current MS value is checked to see if it is in Window A, if so, the system returns to box 90 and State 1 without active adjustment of the pressure. If not, the system proceeds to box 112 where it is determined whether the current MS value is in Window B. If so, the system returns to box 96 and State 2. If not, the system proceeds to box 114 where it is determined whether the system has been in State 3, Window C, for more than 15 seconds. If the system has been in State 3 for less than 15 seconds, the system returns to box 110 via box 108. If the system has been in State 3, and thus Window C, for more than 15 seconds, the system proceeds to box 116 and enters State 4 where a pressure adjustment is initiated by setting the AdjustReady Flag. After setting the AdjustReady Flag, the system proceeds to box 118. It is determined whether the pressure adjustment procedure has been completed and the AdjustReady Flag been cleared. If the AdjustReady Flag has been cleared, the system returns to box 90 and State 1. If the AdjustReady Flag has not been cleared, the system remains in State 4 and returns to box 116.

Figure 4:
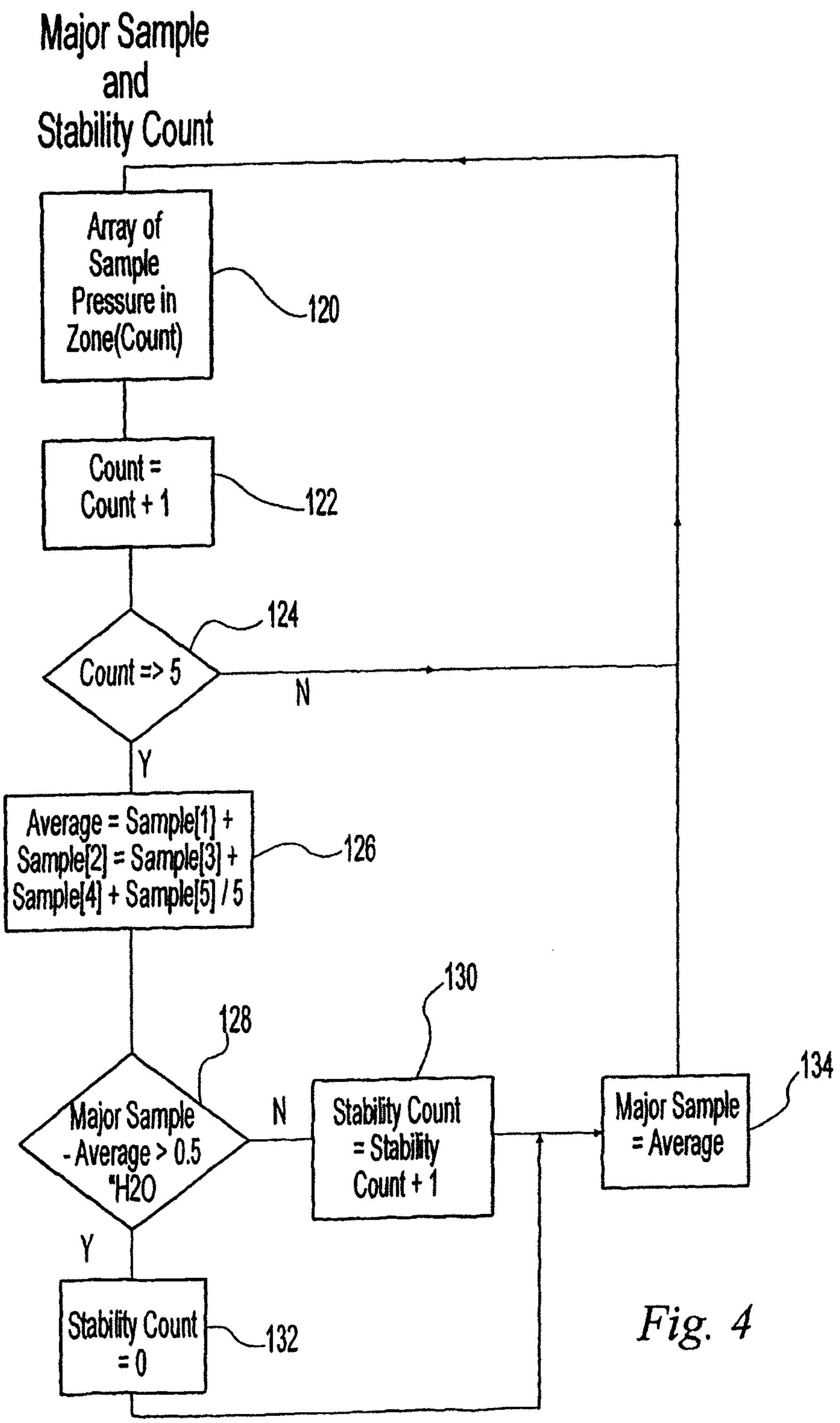
FIG. 4 is a flow chart depicting the determination of the stability of the fluid pressure within a pressurized bladder.

Although not explicitly depicted in FIG. 4, when actively adjusting the pressure of a bladder, if, 2 seconds after making the first adjustment, the pressure is within Window A, the AdjustReady Flag is cleared and the system returns to box 90. If, 2 seconds after making the first adjustment, the pressure is not within Window A, a second adjustment is made. After making such a second adjustment, the AdjustReady Flag is cleared and the process returns to box 90. Twenty seconds must elapse following such a second adjustment before an addition adjustment of the bladder pressure is allowed.

As discussed above, in the AutoDelay flowchart of FIG. 3*b*, box 102 represents the determination of whether or not the pressure has been stable for the preceding 30 seconds. FIG. 4 presents a flowchart representing the process by which this determination is made. Box 120 represents the acquisition of an array of most recent pressure values (including at least the most recent five Major Sample values) for a single one of the bladders 40, 42, 44. The system then proceeds to box 122 where the Count is incremented by 1. At box 124 it is determined whether the Count has reached 5. If not, the system returns to box 120 until the Count reaches 5 and the system can proceed to box 126. At box 126, the average of the most recent 5 Major Samples, i.e., a moving average, is calculated. At box 128, the most recent Major Sample is compared to average value of the most recent Major Samples. If the difference determined at box 128 is greater than 0.5 inches water, the pressure is considered not stable and the Stability Count is returned to 0. If the difference determined at box 128 is less than 0.5 inches water, the pressure is considered stable and the Stability Count is increased by 1. The value of the Stability Count is thereby representative of the time for which the pressure has remained stable with larger Stability Count values pertaining to longer periods of stable pressure values. At box 134, the current Major Sample value is set as the average value and the process returns to box 120.

While the present invention has been described as having an exemplary design, the present invention may be further modified within the spirit and scope of this disclosure. This application is therefore intended to cover any variations, uses, or adaptations of the present invention using its general principles.

What is claimed is:

1. A method of supporting a patient, the method comprising, with a pressure control assembly:

monitoring the fluid pressure within at least one fluid containing bladder configured to support at least a portion of the weight of the patient; and regulating the fluid pressure within the at least one bladder by:

defining an acceptable range of fluid pressures;

adjusting the fluid pressure within the at least one bladder only when a fluid pressure value has been detected outside the acceptable range of fluid pressures and a time period following the detection of the fluid pressure value has elapsed without the fluid pressure within the at least one bladder returning to the acceptable range of fluid pressure values;

defining the time period to have a length that is greater than zero and variable up to a maximum value, determining a difference between the fluid pressure value and the acceptable range of pressure values;

dynamically determining the length of the time period based on the difference between the fluid pressure value and the acceptable range of pressure values, and determining the length of the time period differently based on the amount of the difference between the fluid pressure value and the acceptable range of pressure values.

2. The method of claim 1 wherein the acceptable range of fluid pressure values is variable and the acceptable range of fluid pressure values is a function of the weight of the patient.

3. The method of claim 1 wherein the patient is supported on an articulating surface having a plurality of configurations, the acceptable range of fluid pressure values is variable and the acceptable range of fluid pressures values is a function of the configuration of the articulating surface.

4. The method of claim 1, wherein the providing step includes providing first and second bladders, and the regulating step includes adjusting the fluid pressure within the first and second bladders at substantially spaced-apart times.

5. The method of claim 1, comprising:

sensing the fluid pressure with a sensor, determining whether the fluid pressure is outside the acceptable range of pressure, the acceptable range having an upper boundary and a lower boundary, initiating adjustment of the fluid pressure within the bladder after the time period has elapsed without the fluid pressure within the bladder returning to the acceptable range of pressure, changing at least one of the upper boundary and the lower boundary of the acceptable range of pressure based on a current configuration of the patient support, calculating the difference between the fluid pressure and the acceptable range of pressure, and determining the time period based on the difference between the fluid pressure and the acceptable range of pressure.

6. The method of claim 5, comprising executing a first algorithm to determine the time period if the difference between the fluid pressure and the acceptable range of pressure does not exceed a first window value.

7. The method of claim 6, comprising executing a second algorithm to determine the time period if the difference between the fluid pressure and the acceptable range of pressure exceeds the first window value, wherein the desired time period determined by the first algorithm has a first maximum value and the time period determined by the second algorithm has a second maximum value, and the first maximum value is greater than the second maximum value.

8. The method of claim 7, wherein the time period determined by the first algorithm has a variable length and the time period determined by the second algorithm has a substantially invariable length.

9. The method of claim 5, wherein the time period is a function of the stability of the sensed fluid pressure.

10. The pressure control assembly of claim 9, wherein the stability of the fluid pressure is a function of a difference between a first variable representative of a current sensed fluid pressure value and a second variable representative of a moving average of a most recent set of the sensed fluid pressure values.

* * * * *